US006691213B1

United States Patent
Luu et al.

(10) Patent No.: US 6,691,213 B1
(45) Date of Patent: Feb. 10, 2004

(54) COMPUTER SYSTEM AND METHOD FOR ACCESSING A PROTECTED PARTITION OF A DISK DRIVE THAT LIES BEYOND A LIMITED ADDRESS RANGE OF A HOST COMPUTER'S BIOS

(75) Inventors: Vu V. Luu, Milpitas, CA (US); Mark F. Vallis, Rancho Santa Margarita, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 249 days.

(21) Appl. No.: 09/796,915

(22) Filed: Feb. 28, 2001

(51) Int. Cl.[7] ............................................... G06F 12/00
(52) U.S. Cl. ........................... 711/163; 711/112; 711/4; 711/201; 713/1; 713/2; 713/100; 710/10
(58) Field of Search ............................. 711/4, 163, 166, 711/164–165, 201; 713/2, 200, 1, 100; 710/10, 8

(56) References Cited

U.S. PATENT DOCUMENTS

| | | | | |
|---|---|---|---|---|
| 5,022,077 A | * | 6/1991 | Bealkowski et al. ....... 340/5.74 |
| 5,355,489 A | * | 10/1994 | Bealkowski et al. ........... 713/2 |
| 5,481,754 A | * | 1/1996 | Piazza ........................... 710/3 |
| 5,657,445 A | * | 8/1997 | Pearce .......................... 710/37 |
| 5,754,821 A | * | 5/1998 | Cripe et al. ................. 711/164 |
| 5,809,230 A | * | 9/1998 | Pereira ........................ 713/200 |
| 5,864,698 A | * | 1/1999 | Krau et al. ..................... 713/2 |
| 6,035,420 A | * | 3/2000 | Liu et al. ...................... 714/25 |
| 6,122,733 A | * | 9/2000 | Christeson et al. ............. 713/2 |
| 6,154,835 A | * | 11/2000 | Chrabaszcz et al. .......... 710/10 |
| 6,282,647 B1 | * | 8/2001 | Leung et al. ................ 713/100 |
| 6,385,721 B1 | * | 5/2002 | Puckette ........................ 713/2 |
| 6,542,979 B1 | * | 4/2003 | Eckardt ....................... 711/173 |

* cited by examiner

Primary Examiner—Mano Padmanabhan
Assistant Examiner—Zhuo H Li
(74) Attorney, Agent, or Firm—Milad G. Shara, Esq.; Robroy R. Fawcett, Esq.

(57) ABSTRACT

The invention may be embodied in a method and a related computer system. The computer system includes a host computer with a native drive-access routine having a limited address range, and a disk drive with a protected area that is inaccessible to a user's preferred operating system. The protected area also lies beyond the limited address range. The method includes receiving and detecting a command in the disk drive for reading a master boot record to initiate a bootload of the operating system. In response to detecting the command, the method includes transferring a drive-selected master boot record that, when executed in the computer system, initiates a process that enables address spoofing, loads an extended-address drive-access routine from the protected area using spoofed addresses within the limited address range, and executes the extended-address drive-access routine to replace the native drive-access routine for providing access to the protected area.

13 Claims, 5 Drawing Sheets

| DDSAP COMMANDS ||
| --- | --- |
| REGISTER | VALUE |
| FEATURES | 57h (key, ASCII "W") |
| SECTOR COUNT | 44h (key, ASCII "D") |
| SECTOR NUMBER | 43h (key, ASCII "C") |
| CYLINDER LOW | 03h = RETURN DDSAP START LBA<br>04h = RETURN DDSAP SIZE<br>05h = ENABLE SPOOFING<br>06h = DISABLE SPOOFING<br>07h = OPEN DDSAP<br>08h = CLOSE DDSAP<br>09h = SET FLAG |
| CYLINDER HIGH | 00h |
| COMMAND | 8Ah (VENDOR UNIQUE) |

FIG. 5

COMPUTER SYSTEM AND METHOD FOR ACCESSING A PROTECTED PARTITION OF A DISK DRIVE THAT LIES BEYOND A LIMITED ADDRESS RANGE OF A HOST COMPUTER'S BIOS

BACKGROUND OF THE INVENTION

1. Field of the Invention

The present invention relates to digital information storage, and more particularly, to a computer system and method for accessing a protected partition of a disk drive.

2. Description of the Prior Art

Traditionally, a disk drive provides a nonvolatile disk media for storage of data under the exclusive control of a host computer's operating system. Generally, a user installs an application program on the disk drive from a portable media such as floppy disk and/or compact-disk read-only-memory (CDROM), or from another computer over a network. Thus, the user participates in the installation of the application program. Such installation activity fails to take advantage of the capacity and the capability of current disk drives.

A host computer generally includes a basic input output system (BIOS) that provides routines for performing fundamental tasks such as accessing a disk drive. However, the storage capacity of current disk drives may exceed an address range of a host computer's BIOS further impeding efforts to take advantage of the capacity and capability of current disk drives.

Accordingly, there exists a need for overcoming a host computer's BIOS limits that may impede advantageous use of the capacity and capability of current disk drives. The present invention satisfies these needs.

SUMMARY OF THE INVENTION

The present invention may be embodied in a method and a related computer system. The computer system includes a disk drive and a host computer with a native drive-access routine having an address range. The disk drive includes a user area having data sectors that are accessible to a user's preferred operating system and a protected area having data sectors that are inaccessible to the user's preferred operating system. The method provides access to data sectors of the protected area having addresses that lie beyond the address range of the native drive-access routine. The method includes receiving a command in the disk drive for reading a master boot record for the user's preferred operating system to initiate a bootload of the user's preferred operating system, and detecting the command in the disk drive. In response to detecting the command, transferring a drive-selected master boot record that, when executed in the computer system, initiates a process that enables address spoofing in the disk drive, loads an extended-address disk-access routine from the protected area using spoofed addresses associated with data sectors that lie within the address range of the native drive-access routine, and executes the extended-address disk-access routine to replace the native drive-access routine for providing access to data sectors having addresses that lie within the protected area.

Further, the process initiated by the drive-selected master boot record may disable address spoofing after the extended-address disk-access routine is loaded from the protected area. The disk drive may perform address spoofing by accessing data from a predetermined spoof data sector having an address that lies within the protected area in response to a host computer request for data from a target data sector having an address that lies within the address range of the native drive-access routine. The extended-address disk-access routine may have an address range that includes addresses for data sectors that lie within the protected area. The native disk-access routine may be an interrupt routine of a basic input output system (BIOS) of the host computer.

BRIEF DESCRIPTION OF THE DRAWINGS

The accompanying drawings illustrate embodiments of the present invention and, together with the description, serve to explain the principles of the invention.

FIG. 5 is table of commands for locating and controlling access to a protected area of the disk drive of FIG. 2.

DETAILED DESCRIPTION

Figure 1:
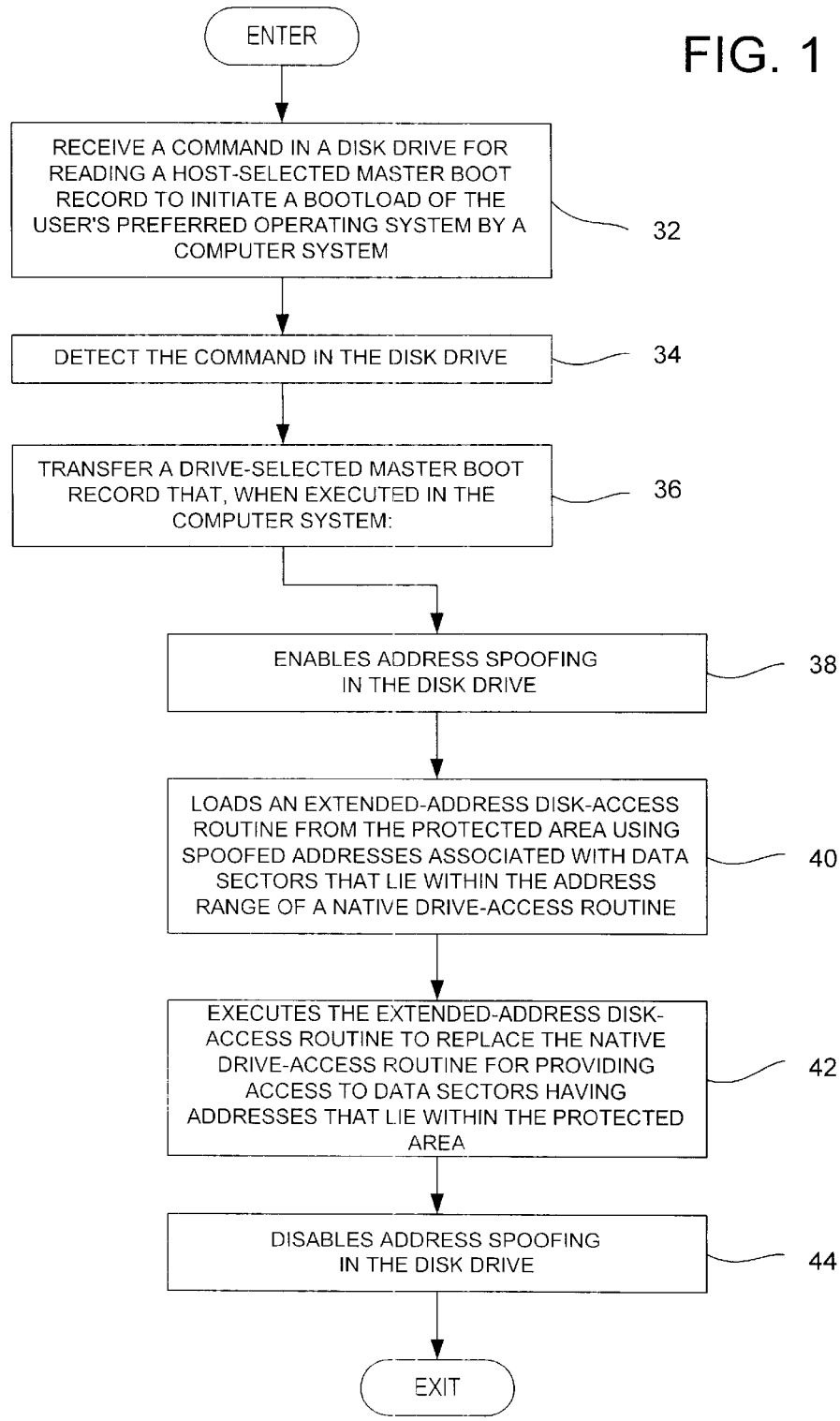
FIG. 1 is a flow diagram illustrating a method for accessing a protected area of a disk drive that lies beyond a limited address range of a host computer's BIOS, according to the present invention.
Figure 2:
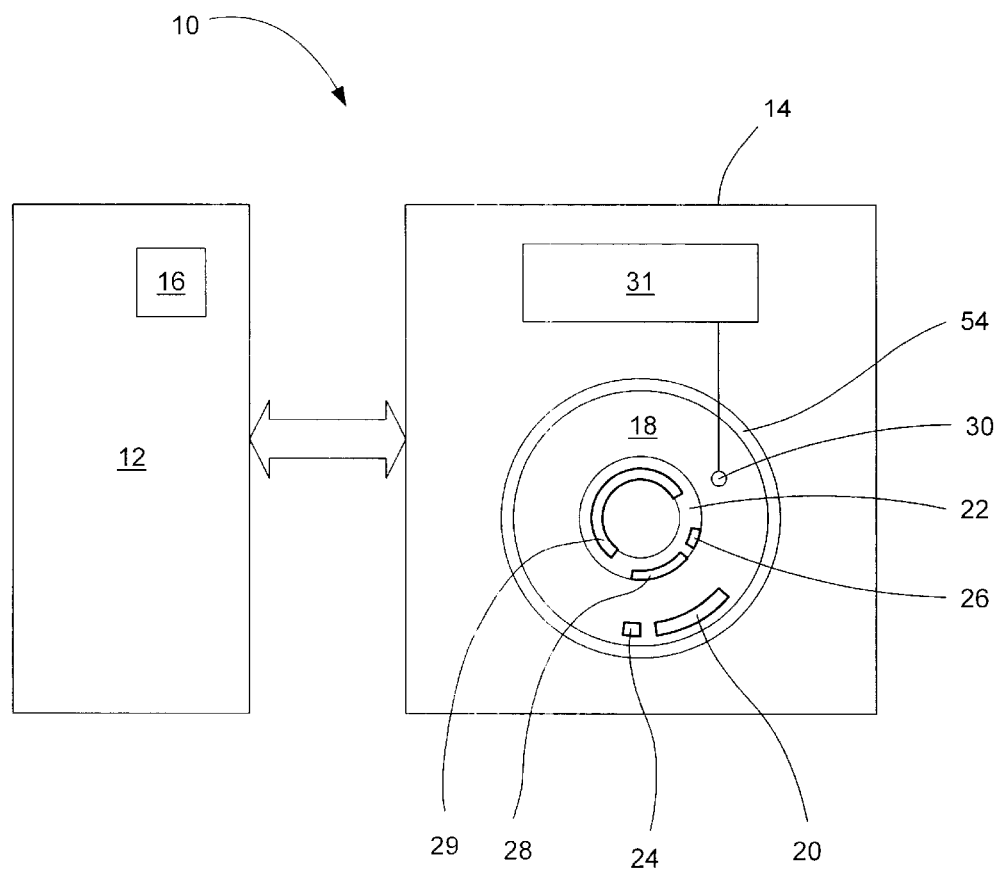
FIG. 2 is a block diagram of a computer system, having a host computer coupled to a disk drive with the protected area, for implementing the access method of FIG. 1.

With reference to FIGS. 1 and 2, the present invention may be embodied in a method (FIG. 1), and a related computer system 10 (FIG. 2) having a host computer 12 and a disk drive 14, for overcoming address limitations of the host computer when accessing the disk drive. The host computer includes a native drive-access routine 16 having a limited address range. The disk drive includes a user area 18 having data sectors that are accessible to a user's preferred operating system 20 and a protected area 22 having data sectors that are inaccessible to the user's preferred operating system. The method provides access to data sectors of the protected area having addresses that lie beyond the address range of the native drive-access routine. The method includes receiving a command in the disk drive for reading a master boot record 24 for the user's preferred operating system to initiate a bootload of the user's preferred operating system (step 32), and detecting the command in the disk drive (step 34). In response to detecting the command, transferring a drive-selected master boot record 26 (step 36) that, when executed in the computer system, initiates a process that enables address spoofing in the disk drive (step 38), loads an extended-address disk-access routine 28 from the protected area using spoofed addresses associated with data sectors that lie within the address range of the native drive-access routine (step 40), and executes the extended-address disk-access routine to replace the native drive-access routine for providing access to data sectors having addresses that lie within the protected area (step 42). Further, the process initiated by the drive-selected master boot record 26 may disable address spoofing in the disk drive 14 (step 44) after the extended-address disk-access routine 28 is loaded from the protected area 22.

The disk drive 14 may perform address spoofing by accessing data from a predetermined spoof data sector having an address that lies within the protected area 22 in response to a host-computer 12 request for data from a target data sector having an address that lies within the address range of the native drive-access routine 16. The extended-address disk-access routine 28 may have an address range that includes addresses for data sectors that lie within the protected area. The native disk-access routine may be an interrupt routine of a basic input output system (BIOS) of the host computer The present invention is particularly advantageous in the implementation of techniques for automatically loading an application program 29 from the protected area 22 to the user area 18 and installing the application program for execution under the direction of the user's preferred operating system 20. The application program may provide a variety of options to a user including presenting the user with content options prior to conventional bootload startup presentations of the user's preferred operating system or prior to presentations of other application programs. The techniques for automatically loading and installing the application program are described in U.S. patent application Ser. No. 09/796,701, filed on Feb. 28, 2001, titled "METHOD FOR INSTALLING AN APPLICATION PROGRAM, TO BE EXECUTED DURING EACH BOOTLOAD OF A COMPUTER SYSTEM FOR PRESENTING A USER WITH CONTENT OPTIONS PRIOR TO CONVENTIONAL SYSTEM STARTUP PRESENTATIONS, WITHOUT REQUIRING A USER'S PARTICIPATION TO INSTALL THE PROGRAM", which application is incorporated herein by reference.

Figure 3:
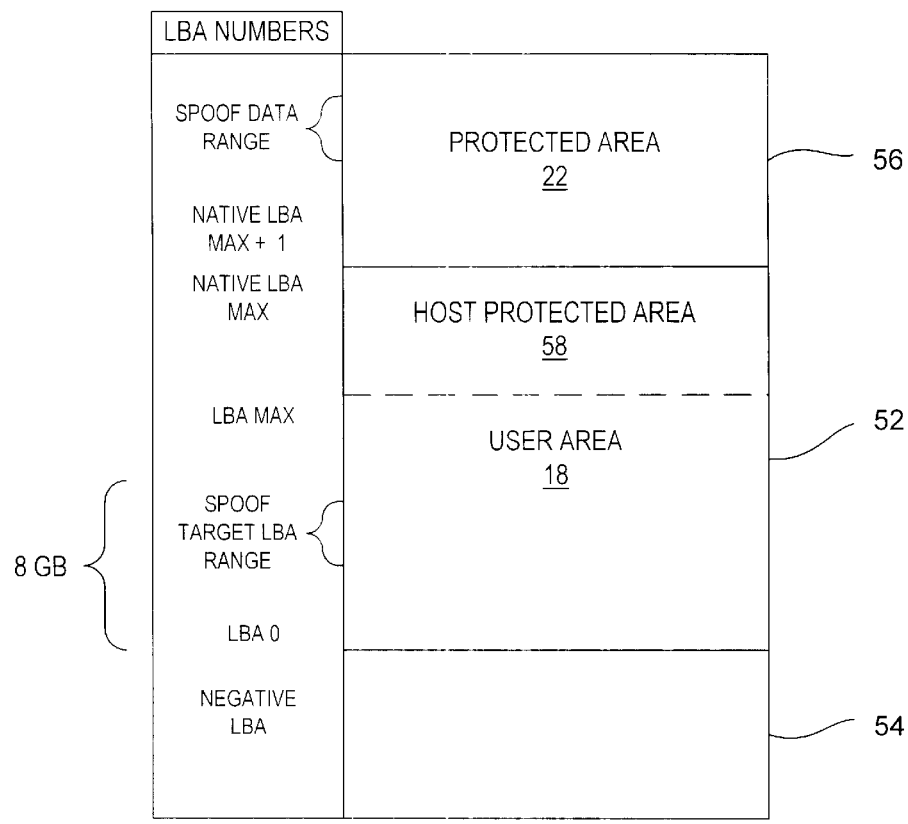
FIG. 3 is a block diagram illustrating the organization of data storage sectors in the disk drive of FIG. 2.

The disk media of the disk drive 14 is accessed using a head assembly 30 and may be divided into data storage sectors, each generally storing 512 data bytes. Each sector may be addressed using a logical block address (LBA). A linear addressing scheme using the LBAs for addressing the sectors is shown in FIG. 3. The data storage sectors are organized into a user partition 52, a drive management partition 54, and a disk-drive-selected application partition 56. The user partition includes the user area 18 and may be assigned to LBA numbers 0 through a native maximum (MAX) LBA. The host computer 12 may access the data storage sectors in the user partition using an industry standard interface protocol such as the AT Attachment (ATA) Interface between host computers and storage devices. The ATA standard also defines a host-protected area 58 within the user partition for data storage outside the normal file system of the user's preferred operating system 20. The operating system cannot change data in the host-protected area. The host-protected area is intended for use only by the host computer's BIOS or other low-level boot time process when the storage device is initially configured.

The drive management partition 54 may be assigned to negative LBA numbers and the corresponding data storage sectors may be accessed using drive management commands. The data in the drive management partition generally includes disk drive configuration and physical format information written by the disk-drive manufacturer during initial testing and configuration of the disk drive 14. The drive management commands generally vary from manufacturer to manufacturer.

The disk-drive-selected application partition (DDSAP) 56 includes the protected area 22 and is assigned to "spare" data storage sectors above the native MAX LBA number. Generally, the DDSAP is configured by the manufacturer before shipment of the disk drive 14. The DDSAP sectors are visible to the disk drive's microprocessor-based internal controller 31 (FIG. 2) but normally are not visible to the host computer 12. Accordingly, data stored in the DDSAP may not be destroyed by logical partitioning and formatting processes performed on the user partition 52.

The host computer 12, when initially turned on, boots up by requesting a host-selected master boot record (MBR) 24 for the user's preferred operating system 20 from LBA 0 of the user partition 52. However, the disk drive 14 may determine that an interrupt routine or an application program 29 should be loaded from the protected area 22. Accordingly, the disk drive may respond to the LBA 0 request by returning the disk-drive-selected MBR 26 that directs the host computer to load the interrupt routine or application program. After installation, the disk drive may direct the host computer to reboot and the disk drive then responds to the next LBA 0 request with the host-selected MBR resulting in a normal boot process.

A disk drive 14 having a microprocessor-based controller 31 and that may substitute an LBA request with alternative data is described in U.S. patent application Ser. No. 09/507,121, filed on Feb. 17, 2000, titled "DISK DRIVE FOR SELECTIVELY SATISFYING A READ REQUEST FROM A HOST COMPUTER FOR A FIRST VALID DATA BLOCK WITH A SECOND VALID DATA BLOCK", which application is incorporated herein by reference. The disk drive includes firmware used by the microprocessor-based controller for implementing the operation of the methods of the invention and the data structures used in the invention.

Direct access to the protected area 22 may not be available in host computers 12 having a power-on-self-test (POST) procedure. The POST procedure may be performed after the host computer is turned on, but before the MBR 24 is requested, and may include obtaining information relating to the size of the disk drive 14 (i.e., the MAX LBA value) and making the size information available to the interrupt routines of the BIOS. Generally, the POST procedure may include only the user partition 52 and user area 18, and may not detect and include the protected area, in the size information. Accordingly, the interrupt routines of the BIOS may not be able to access the sectors having LBA numbers beyond the native MAX LBA number reported by the POST procedure.

Another concern that arises with respect to accessing data in the protected area 22 relates to an internal limitation of older host computers 12. For example, some older models of microprocessor-based host computers have a native BIOS interrupt routine 16 (Int 13h) for reading and writing data that cannot address LBA numbers that correspond to a storage capacity beyond about 8 Gigabytes. A replacement interrupt routine may be installed in such a host computer that replaces the native interrupt routine of the BIOS. However, the host computer cannot access sectors beyond the BIOS limit until the replacement interrupt routine has been loaded, typically during bootload of the user's preferred operating system 20. Accordingly, the host computer may not be able to access the protected area if the protected area lies above the limited LBA range of the native interrupt routines of the BIOS.

The disk drive 14 may overcome the LBA addressing limitations of the native interrupt routine 16 of the BIOS by "spoofing" sector addresses within a target LBA range. In LBA address spoofing, the host computer 12 requests data from a sector having a target LBA number that is within the address range of the native interrupt routine. The disk drive, however, substitutes the host-requested data with drive-selected data from a sector, within a spoof data range, that has an LBA number that is above the address range of the native interrupt routine. The spoof target LBA range is typically within the user area 28 and the spoof data range is typically within the protected area 22.

Figure 4:
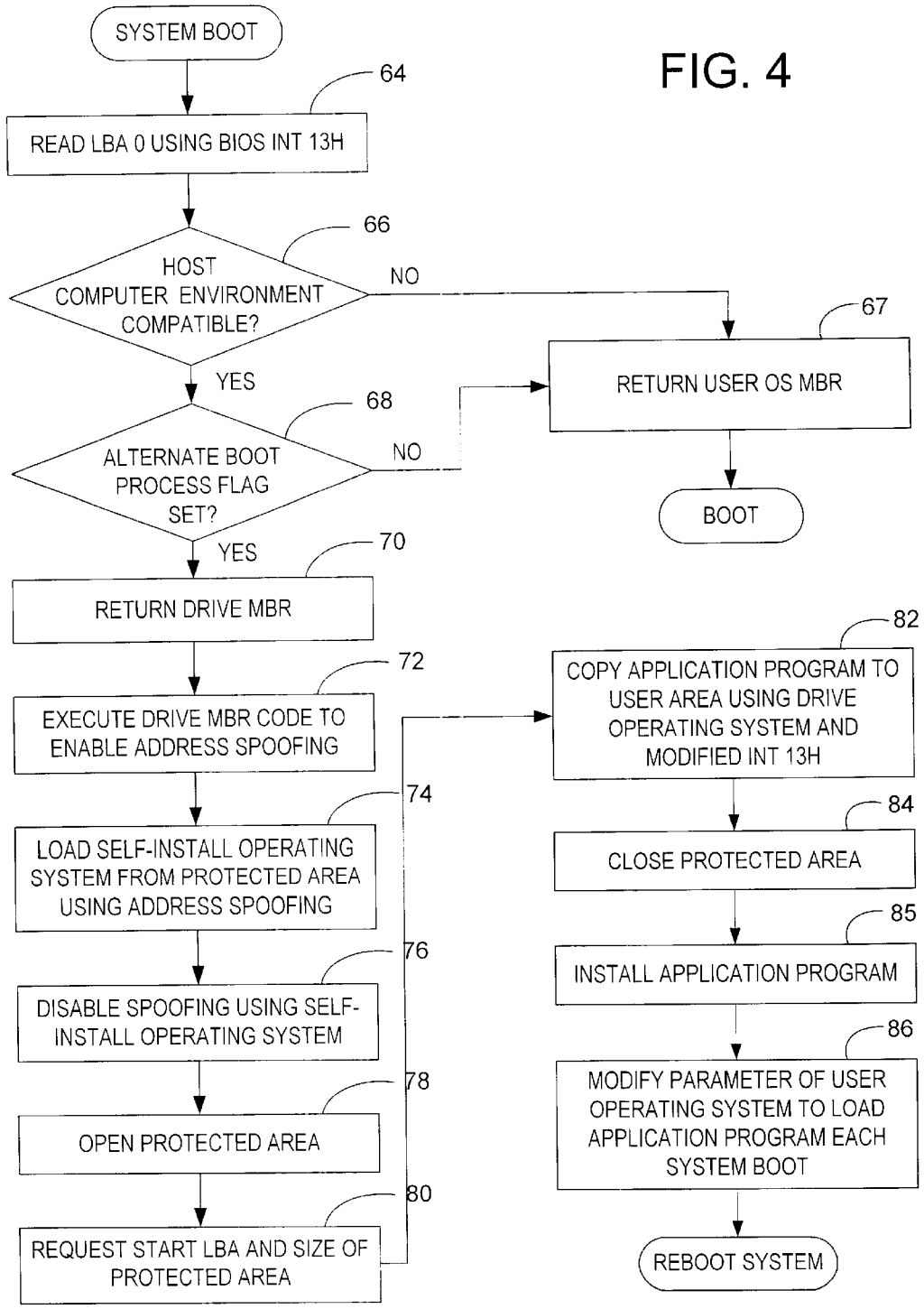
FIG. 4 is a flow diagram illustrating a method for overcoming a native BIOS interrupt routine address limitation, according to the present invention.

A process for address spoofing of host data requests is shown in FIG. 4. Upon system boot, the host computer 12 issues a command to read LBA 0 from the disk drive 14 using the native interrupt routine 26 (Int 13h) of the BIOS (step 64). The disk drive determines whether the user's preferred operating system 20 provides an environment that is compatible with the desired application program 29 and an automatic installation procedure (step 66). If the operating system fails to provide a compatible environment, the drive returns the MBR 24 for the user's preferred operating system in response to the read LBA 0 command and the normal boot process continues (step 67). Otherwise, the disk drive determines whether an alternate boot process flag is set in the disk drive (step 68). If the flag is not set, the disk drive also returns the MBR for the user's preferred operating system (step 67) and the normal boot process continues. If the flag is set, the disk drive returns a drive-selected MBR 26 (step 70). The drive-selected MBR may be stored in the protected area 22 and/or in the drive-management partition 54. The drive-selected MBR includes code executed by the host computer that enables address spoofing (step 72). While address spoofing is enabled, the host computer requests, using the native interrupt routine 16 of the BIOS, data from target LBA numbers that are within the range of the native interrupt routine. The disk drive spoofs the request by providing data from LBA numbers outside of the range of the native interrupt routine, such as from the protected area. Thus, an alternate self-install operating system may be loaded to temporarily operate the host computer (step 74). The self-install operating system may include an extended-address interrupt routine 28 that replaces the native interrupt routine of the BIOS. An example is the Linux operating system kernal for accessing a disk drive formatted with a file structure of the Windows operating system. The self-install operating system may disable address spoofing (step 76) and open the protected area (step 78). A start LBA number and the size of the protected area may be requested (step 80). As mentioned above, an application program 29 may be copied to the user area 18 using the extended-address interrupt routine (step 82) and the protected area then may be closed (step 84). The application program may be installed (step 85) and a parameter of the user's preferred operating system may be modified to load the application program on the next system boot (step 86), and computer system 10 then may be commanded to reboot.

The DDSAP 56 may be accessed by using the commands shown in FIG. 5. The commands are implemented by placing the predetermined command values in the registers of the disk drive 14. A vendor unique command value (8Ah) may be placed in the command register and a value of 00h may be placed in the cylinder high register. The desired DDSAP command may be placed in the cylinder low register. A manufacturer access code may be placed in the sector number, sector count and features registers. The DDSAP commands may include a RETURN DDSAP START LBA command (03h), a RETURN DDSAP SIZE command (04h), an OPEN DDSAP command (07h), and a CLOSE DDSAP command (08h). The RETURN DDSAP START LBA command returns the number of the starting LBA of the DDSAP. The RETURN DDSAP SIZE command returns a count of the number of LBAs in the DDSAP. After receiving an OPEN DDSAP command, the disk drive allows write and read commands issued by the host computer 18 to access the DDSAP sectors. The write and read commands may be standard ATA write and read commands. After receiving a CLOSE DDSAP command, the disk drive forbids access to the DDSAP sectors and returns an error or abort in response to host commands directed to the DDSAP sectors. The DDSAP commands may also include a SET FLAG command (09h) for indicating whether an alternate boot process should be implemented.

We claim:

1. In a computer system including a host computer with a native drive-access routine having an address range, and including a disk drive with a user area having data sectors that are accessible to a user's preferred operating system and a protected area having data sectors that are inaccessible to the user's preferred operating system, a method for accessing data sectors of the protected area having addresses that lie beyond the address range of the native drive-access routine, the method comprising:

receiving a command in the disk drive for reading a master boot record for the user's preferred operating system to initiate a bootload of the user's preferred operating system; and detecting the command in the disk drive and, in response to detecting the command, transferring a drive-selected master boot record that, when executed in the computer system, initiates a process that:

enables address spoofing in the disk drive, loads an extended-address disk-access routine from the protected area using spoofed addresses associated with data sectors that lie within the address range of the native drive-access routine, and executes the extended-address disk-access routine to replace the native drive-access routine for providing access to data sectors having addresses that lie within the protected area.

2. A method for accessing protected-area data sectors as defined in claim 1, wherein the process initiated by the drive-selected master boot record further disables address spoofing after the extended-address disk-access routine is loaded from the protected area.

3. A method for accessing protected-area data sectors as defined in claim 1, wherein the disk drive performs address spoofing by accessing data from a predetermined spoof data, sector having an address that lies within the protected area in response to a host computer request for data from a target data sector having an address that lies within the address range of the native drive-access routine.

4. A method for accessing protected-area data sectors as defined in claim 1, wherein the extended-address disk-access routine has an address range that includes addresses for data sectors that lie within the protected area.

5. A method for accessing protected-area data sectors as defined in claim 1, wherein the native drive-access routine is an interrupt routine of a basic input output system (BIOS) of the host computer.

6. A method for accessing protected-area data sectors as defined in claim 1, wherein address spoofing comprises having the disk drive substitute host-requested data from a sector having a target logical block address that lies within the address range of the native drive-access routine with drive-selected data from a sector having a logical block address that lies beyond the address range of the native drive-access routine.

7. A method for accessing protected-area data sectors as defined in claim 1, wherein the command in the disk drive for reading the master boot record for the user's preferred operating system is issued by the host computer for reading a host-computer-selected master boot record for the user's preferred operating system.

8. A computer system, comprising:
a host computer having a native drive-access routine having an address range;
a disk drive having a user area including data sectors that are accessible to a user's preferred operating system and a protected area including data sectors that are inaccessible to the user's preferred operating system and that lie beyond the address range of the native drive-access routine;
means for receiving a command in the disk drive for reading a master boot record for the user's preferred operating system to initiate a bootload of the user's preferred operating system;
means for detecting the command in the disk drive and, in response to detecting the command, transferring a drive-selected master boot record; and
means for executing the drive-selected master boot record in the computer system to initiate a process that:
enables address spoofing in the disk drive,
loads an extended-address disk-access routine from the protected area using spoofed addresses associated with data sectors that lie within the address range of the native drive-access routine, and
executes the extended-address disk-access routine to replace the native drive-access routine thereby providing access to data sectors having addresses that lie within the protected area.

9. A computer system as defined in claim 8, wherein the disk drive performs address spoofing by accessing data from a predetermined spoof data sector having an address that lies within the protected area in response to a host computer request for data from a target data sector having an address that lies within the address range of the native drive-access routine.

10. A computer system as defined in claim 8, wherein the extended-address disk-access routine has an address range that includes addresses for data sectors that lie within the protected area.

11. A computer system as defined in claim 8, wherein the native drive-access routine is an interrupt routine of a basic input output system (BIOS) of the host computer.

12. A computer system as defined in claim 8, wherein address spoofing comprises having the disk drive substitute host-requested data from a sector having a target logical block address that lies within the address range of the native drive-access routine with drive-selected data from a sector having a logical block address that lies beyond the address range of the native drive-access routine.

13. A computer system as defined in claim 8, wherein the command in the disk drive for reading the master boot record for the user's preferred operating system is issued by the host computer for reading a host-computer-selected master boot record for the user's preferred operating system.

* * * * *